United States Patent

Sorenson

[15] 3,661,108
[45] May 9, 1972

[54] STEERING SYSTEMS ESPECIALLY FOR WATER CRAFTS

[72] Inventor: Hugh E. Sorenson, 3818-A North 37th Street, Milwaukee, Wis. 53216

[22] Filed: July 27, 1970

[21] Appl. No.: 58,300

[52] U.S. Cl............................................................114/61
[51] Int. Cl................................................................B63b 1/10
[58] Field of Search......................................180/50; 114/61

[56] References Cited

UNITED STATES PATENTS 2,093,320  9/1937  Hunt........................................114/61
644,843   3/1900  Bink.........................................180/50
1,113,071 10/1914 Turner.....................................180/50

*Primary Examiner*—Andrew H. Farrell
*Attorney*—Alter, Weiss & Whitesel

[57] ABSTRACT

A vehicle is supported at each of its four corners by any suitable means, such as hydrofoils, pontoons, wheels, skiis, or the like. At both the front and back, oppositely disposed supports are rigidly interconnected and the rigid connection is pivotally attached to the vehicle body or hull. A tongue is individually associated with each of the rigid interconnections and the tongues are pivotally interconnected to simultaneously turn both the front and back supports.

7 Claims, 6 Drawing Figures

PATENTED MAY 9 1972 3,661,108
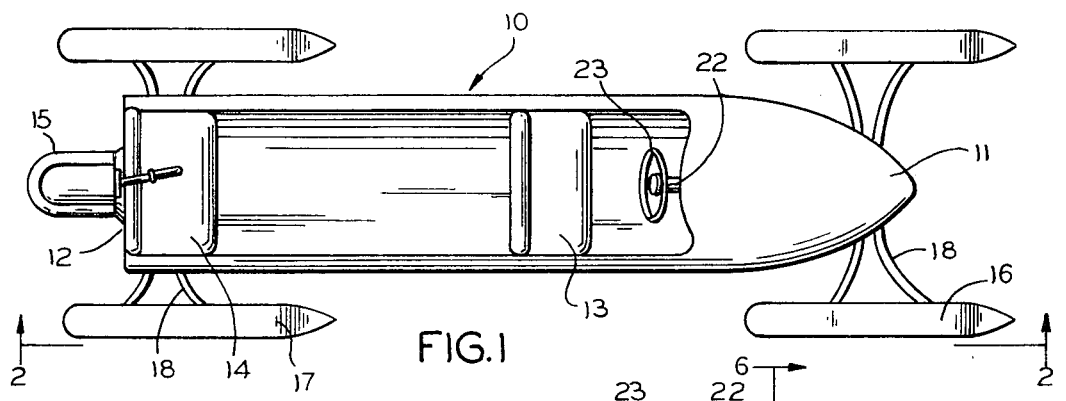
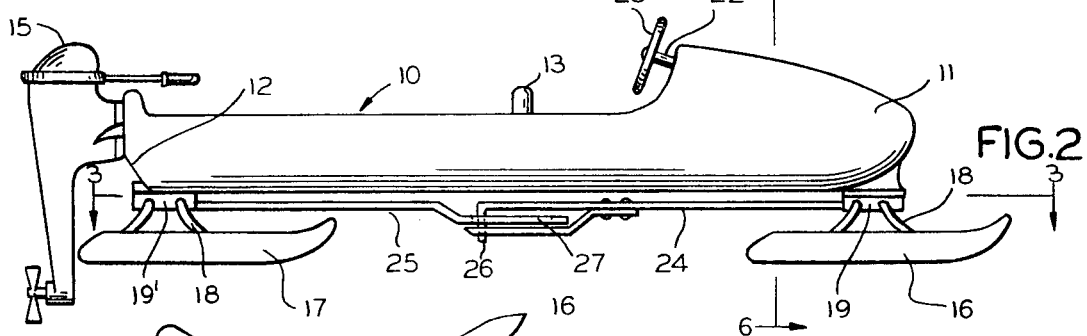
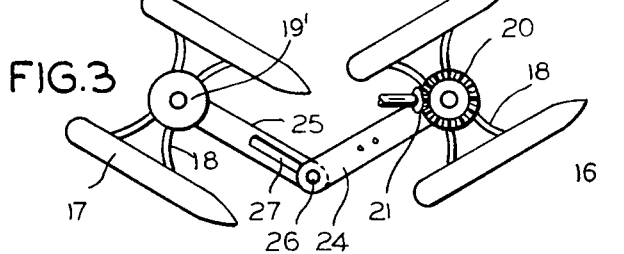
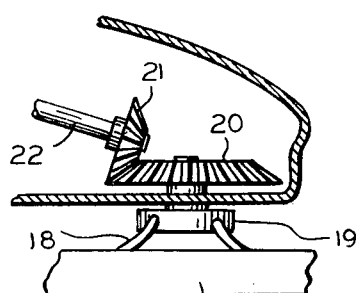
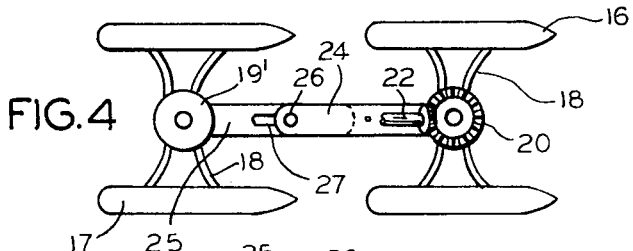
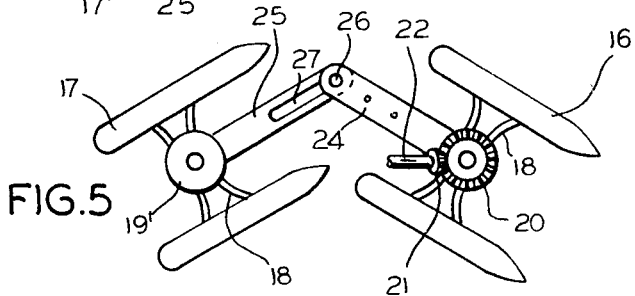
INVENTOR
HUGH E. SORENSON
BY
Alter, Weiss and Whitesel
ATTORNEYS

STEERING SYSTEMS ESPECIALLY FOR WATER CRAFTS

My invention relates to improvements in vehicle steering and more particularly — although not exclusively — to water crafts such as power actuated crafts or sail boats.

In general, the invention provides new and novel steering means especially well adapted for use in pontoon boats. However, the invention is also adaptable to steering any kind of a vehicle such as sleds, wagons, autos; therefore, the term "vehicle" is used herein to describe all suitable vehicles — not just water craft. Likewise, the term "support members" is used herein to cover all suitable vehicular supports such as wheels, skiis, pontoons, hydrofoils, and the like.

More specifically, the invention has particular application to vehicles which are difficult to maneuver or control when tight and quick turns are required. For example, the water craft here shown is adaptable to extremely high speeds, and is particularly useful in areas such as crowded resorts. Therefore, there is a need for tight maneuvers under conditions wherein normal high speed boats cannot safely operate.

Accordingly, an object of my invention is to provide a new and improved means of steering a boat, and overcoming the frictional resistance at the contact between boat and water.

Another object of my invention is to provide a means of steering any type of water craft, especially during high speed forward movement. Still another object of my invention is to provide a device of the described type that is particularly well adapted for foils or pontoons. Conversely stated, another object is to provide a general purpose steering arrangement and vehicle which may be used on land, in the water or over snow.

A further object of my invention is to provide a means of accomplishing the same easy steering means on any type of water craft regardless of whether it is actuated by any particular means. Here, an object is to enable the operator to make sharp turns, as desired.

One of the most important requisites for the operation of any type of water craft is that the operator should be able to steer the craft during its forward movement, with the least amount of effort and skill. The invention provides for accomplishing this effort through use of tandem coupled pontoons, by hydrofoils, or the like, which enables the craft to overcome frictional resistance at increased speed by raising above the surface of the water over which it is traveling. The steering means are provided at both ends of the hull to enable tighter maneuvering.

The device is simple in construction, easy to manipulate, and may be made adaptable to many different types of water craft and other vehicles.

Other and further objects of my invention will become more apparent as the description proceeds, when taken in conjunction with the drawings, in which:

FIG. 1 is a top plan view of an inventive water craft powered by an outboard motor and equipped with four pontoons;

FIG. 2 is a side elevation view of the assembled device shown and taken along line 2—2 of FIG. 1;

FIG. 3 is a schematic view (taken along line 3—3 of FIG. 2) of the pontoons or hydrofoils showing the steering arrangement in a left hand path;

FIG. 4 is a similar schematic view of the pontoons or hydrofoils arranged in a straight forward path;

FIG. 5 is a similar schematic view with the pontoons or hydrofoils in a right hand turn position; and FIG. 6 is a fragmentary view of the steering gears coupled for operating only the front pontoons or hydrofoils (taken along lines 6—6 of FIGS. 1 and 2).

Similar reference characters indicate corresponding parts and features throughout the several views. More particularly, the reference character 10 generally indicates the hull of the watercraft, which may have any convenient design. It may be constructed of any practical material such as wood, plastic or metal. The hull 10 is shown with a bow 11, stern 12, front seat 13, and rear seat 14. However, the arrangement of the seats has little importance to my invention.

In FIGS. 1 and 2, an outboard motor 15 is shown attached to the stern 12 in order to propel the water craft 10 in its travel and to steer the craft while the hull is in the water.

There are four support means at the four corners of the craft, here shown as pontoons. However, it should be understood that other support means such as wheels, skiis, or the like may be used. Two support means are shown as pontoons 16 in the front and two shown as 17 in the rear. If desired, the rear pontoons 17 may be mounted in a stationary manner; however, a pivotal mounting may also be used. The two front pontoons 16 are rigidly interconnected and supported by members 18 leading to a pivoted plate 19 (see FIG. 6). Likewise, the two rear pontoons 17 are rigidly interconnected by members 18. The drawing shows that the front pontoon support is equipped with a bevelled gear 20 which is turned by the pinion 21 attached to the steering column 22. The steering column may be attached to the bow 11 in any convenient and efficient manner. The column 22 is shown as equipped with a steering wheel 23, which is controlled by the operator of the craft. This arrangement turns the pontoons 16 to the right or left to guide the path of the craft.

If desired the rear pontoons 17 may also be pivotally mounted for steering the water craft in a manner shown in FIGS. 3, 4 and 5.

By referring to FIGS. 3 to 5 inclusive, I show a means of steering the rear pontoons 17 in relation to the front pontoons 16. There is a tongue or lever member 24 which is integral with the pivot plate 19 supporting the front pontoons 16. Another tongue or lever member 25 is integral with the pivot plate 19 used for supporting the rear pontoons 17. The lever or tongue member 24 is provided with a vertical pin 26, and the tongue or lever 25 is equipped with a longitudinal slot 27. The pin 26 passes through the slot 27. As the front pivot plate 19 turns, the front tongue or lever member 24 swings, and the pin 26 in the member 24 slidably moves in the slot 27 of the rear tongue or lever member 25. This action swings the rear tongue or lever member 25 in an opposite direction with respect to the front tongue or lever member 24. Thus, the rear pontoons 17 point in an opposite direction as compared to the front pontoons 16. Thus, means are provided for steering the craft at bow and stern with little movement of the steering wheel 23 by the operator.

From the above description it will become apparent that the arrangement as covered by my invention provides a steering device that is well adapted for tight maneuvering. The pontoons or hydrofoils help to eliminate frictional resistance at the surface of the water. As the speed of the craft increases, the hull raises above the water and rests on the pontoons or foils. The linked arrangement of the tongues or levers provides ease of steering while the water craft is so poised above the water.

Although I have shown a specific arrangement of the parts and features constituting my invention, changes may be made without effecting the operativeness of the device. Therefore, the claims are to be construed to cover all equivalents which fall within the spirit and the scope of my invention.

I claim:

1. An elongated vehicle having a body supported at each of four corners,
    means including a tongue for rigidly interconnecting the two front supports,
    means including a tongue for rigidly interconnecting the two rear supports,
    means for pivotally attaching the rigid interconnections to the front and the rear of said vehicle body, the points of said pivot attachments being aligned with the center line in the path of travel followed by said body, bevel gear means surrounding the pivotal attachment of the front support means for rotating said front support means, a steering column with an associated pinion gear for turning said bevel gear, and
    means for interconnecting said tongues whereby any turning of the front support means automatically turns the rear support means to follow said path of travel.

2. The vehicle of claim 1 wherein said vehicle body comprises a water craft hull and each of said support means comprises hydrofoils.

3. The vehicle of claim 1 wherein said vehicle body comprises a water craft hull and each of said support means comprises pontoons.

4. An elongated vehicle having a body supported at the four corners,
   said vehicle comprising a watercraft hull and each of said support means comprising pontoons,
   means including a tongue for rigidly interconnecting the two front supports,
   means including a tongue for rigidly interconnecting the two rear supports,
   means for pivotally attaching the rigid interconnections to the front and rear of said vehicle body, the points of said pivot attachments being aligned with the center line of the path of travel followed by said body,
   means for interconnecting said tongues whereby any turning of the front supports automatically turns the rear support means to follow said path of travel,
   said means for interconnecting said tongues comprising a pivot point pin at the end of one of said tongues, the other of said tongues including a slot along at least part of the length thereof, and said pin sliding in said slot when said front supports turn.

5. The vehicle of claim 4 and steering means associated with said front pontoons for turning the bow of said water craft and swinging said tongues to thereby turn the stern of said water craft.

6. The vehicle of claim 5 and outboard motor means for powering said vehicle and steering said vehicle while the hull is in the water, said outboard motor driving said vehicle at speeds which raises the hull out of the water, said steering means steering when said hull is out of the water.

7. An elongated vehicle having a body supported at each of four corners, means including a tongue rigidly connecting the two front supports,
   means including a tongue for rigidly interconnecting the two rear supports,
   means for pivotally attaching the rigid interconnection to the front and the rear of said vehicle body,
   the points of said pivoted attachments being aligned with the center line in the path of travel followed by said body,
   means for interconnecting said tongues,
   said means for interconnecting said tongues comprising a pivot point pin in one of said tongues at the end thereof,
   the other of said tongues including a slot along at least a part of the length thereof,
   and said pivot point pin arranged to slide in said slot as said front support turns,
   whereby any turning of the front supports automatically turns the rear supports to follow the path of travel.

* * * * *